No. 846,124. PATENTED MAR. 5, 1907.
P. MEYER.
CASH REGISTER.
APPLICATION FILED FEB. 19, 1904. RENEWED OCT. 27, 1906.

6 SHEETS—SHEET 4.

Witnesses.
C. Heymann.
A. Hall.

Inventor
Peter Meyer
by B. Singer atty.

No. 846,124. PATENTED MAR. 5, 1907.
P. MEYER.
CASH REGISTER.
APPLICATION FILED FEB. 19, 1904. RENEWED OCT. 27, 1906.
6 SHEETS—SHEET 5.
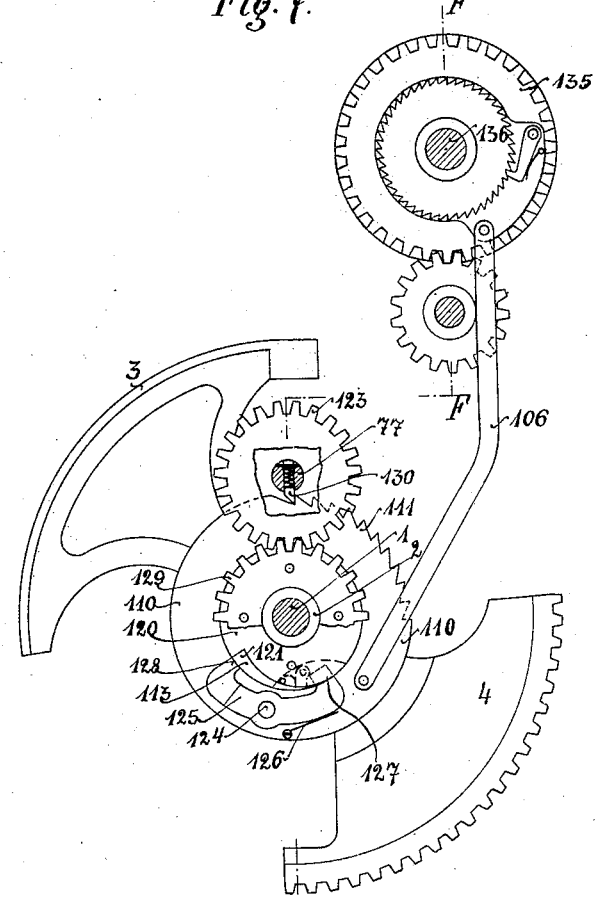
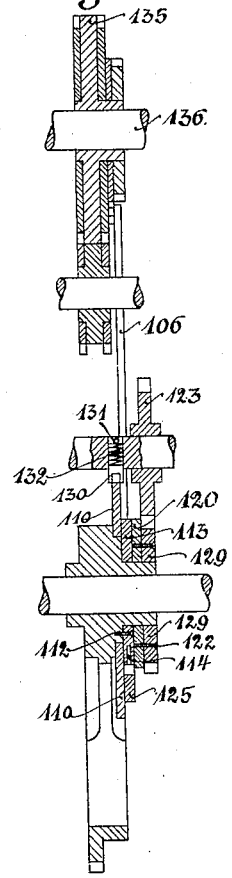
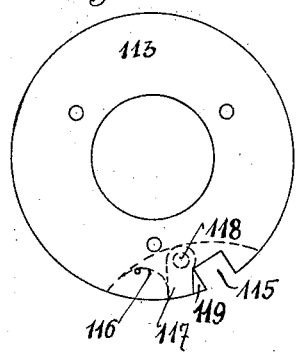
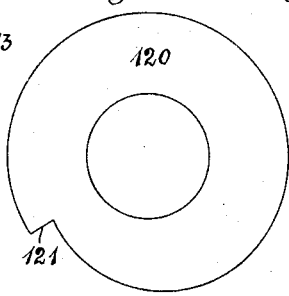
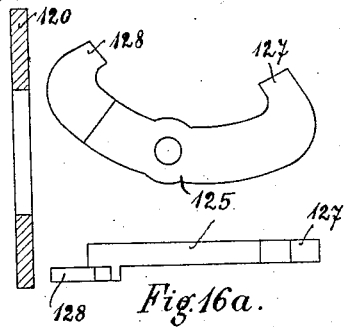
Witnesses:
L. Waldman
E. Heymann
Inventor:
Peter Meyer
by B. Singer
Attorney No. 846,124. PATENTED MAR. 5, 1907.
P. MEYER.
CASH REGISTER.
APPLICATION FILED FEB. 19, 1904. RENEWED OCT. 27, 1906.
6 SHEETS—SHEET 6.
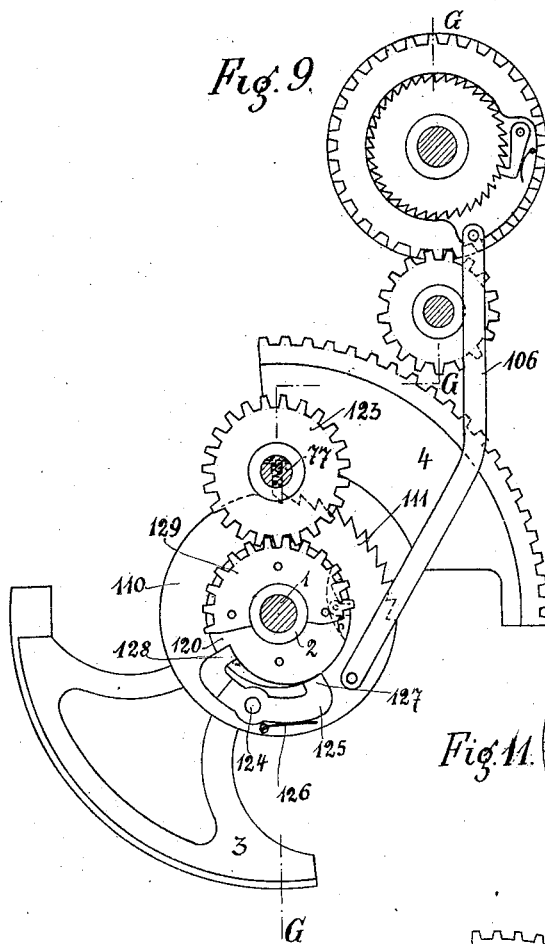
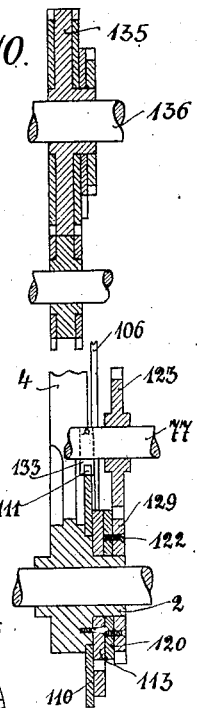
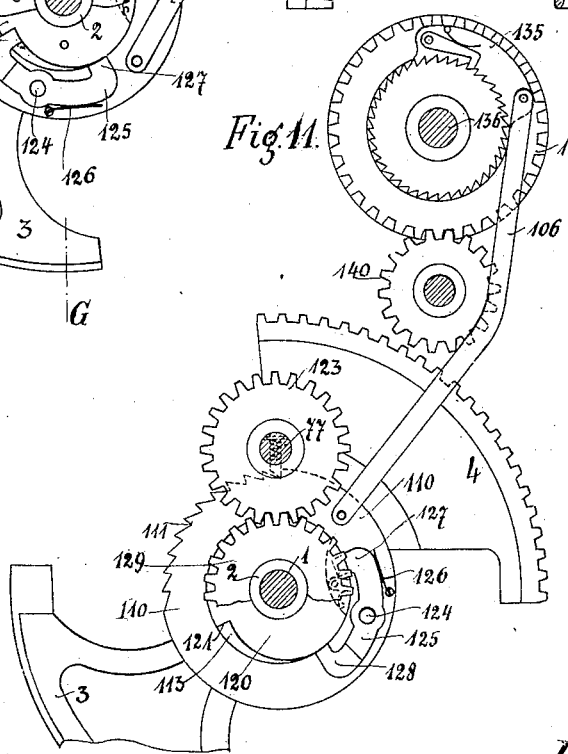
Witnesses:—
L. Waldman
C. Heymann.
Inventor:
Peter Meyer
by P. Singer
Attorney

UNITED STATES PATENT OFFICE.

PETER MEYER, OF COLOGNE-NIPPES, GERMANY.

CASH-REGISTER.

No. 846,124.      Specification of Letters Patent.      Patented March 5, 1907.

Application filed February 19, 1904. Renewed October 27, 1906. Serial No. 340,901.

*To all whom it may concern:*

Be it known that I, PETER MEYER, mechanical engineer, a citizen of the German Empire, residing at Nordstrasse 27, Cologne-Nippes, Rhineland, Prussia, Germany, have invented certain new and useful Improvements in Cash-Registers, of which the following is a specification.

This invention relates to a cash-register in which the registering of the amounts takes place by means of number-segments.

The essential features of the invention are a cash-register with number-segments provided with pawls, the said pawls being provided with locking devices in such a manner that when the rotation of the crank has begun displacement of the number-segments is impossible; also, a cash-register with number-segments and an unlocking-lever for the pawls and a locking device for the said lever which is so constructed that the lever can only return to its original position if the number-segments have fallen to zero; also, in a cash-register with number-segments and the arrangement of a clutch on the number-segment shaft, to which is connected a rod connected with the adding mechanism, so that the adjustment of the number-segments can take place without simultaneous adjustment of the adding mechanism.

The cash-register is shown in the annexed drawings, in which—

Figure 1:
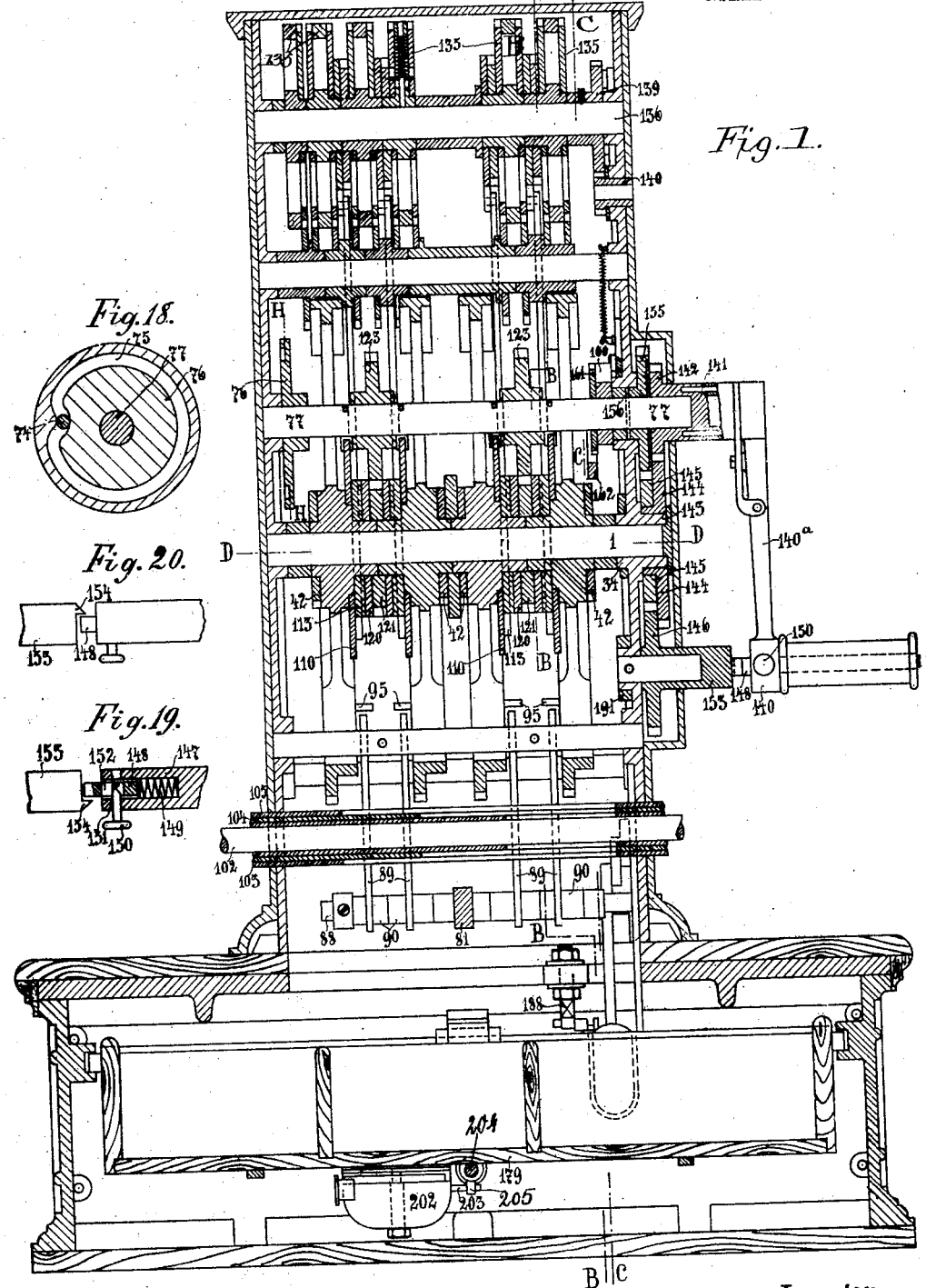
Figure 2:
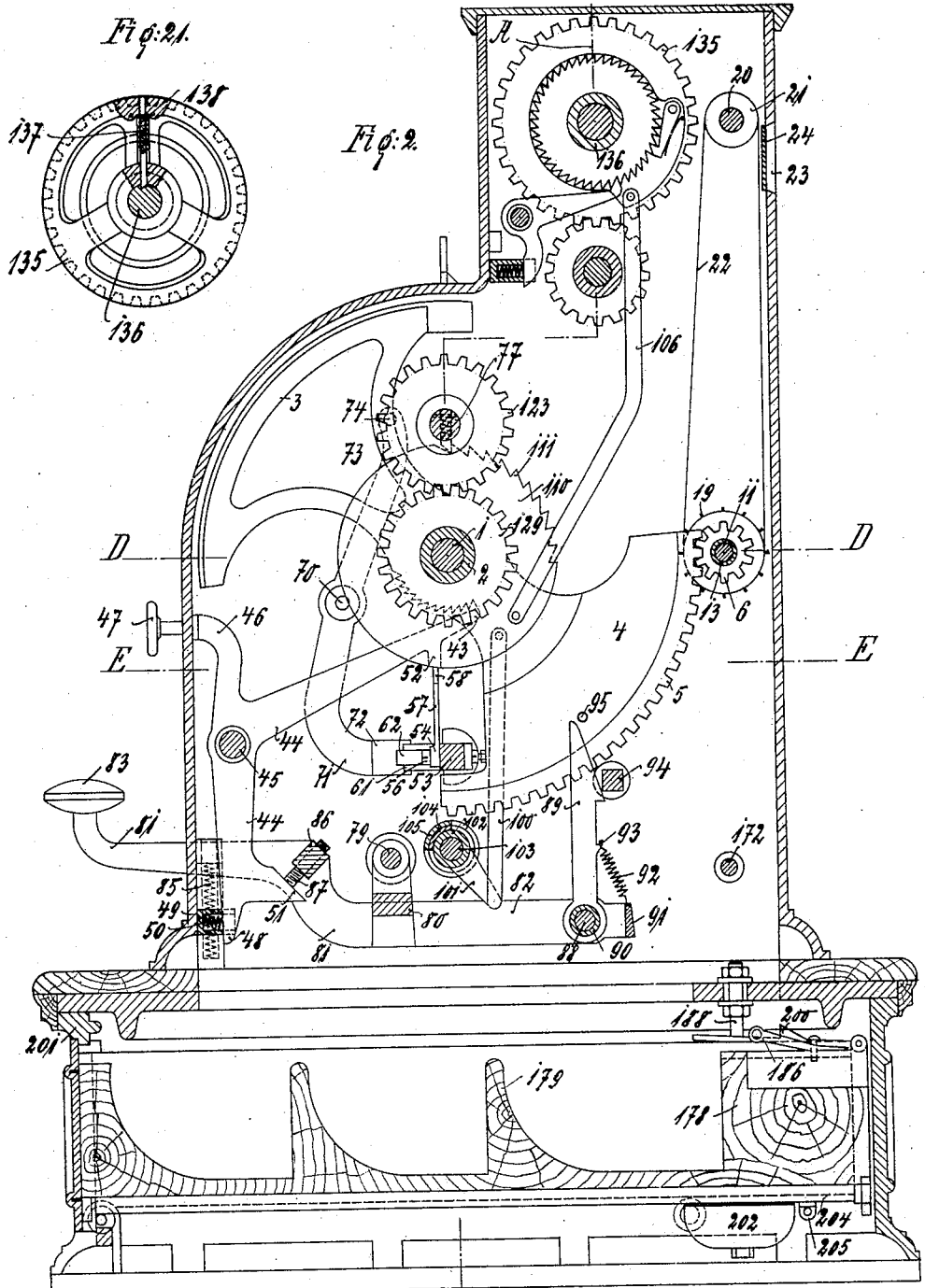
Figure 3:
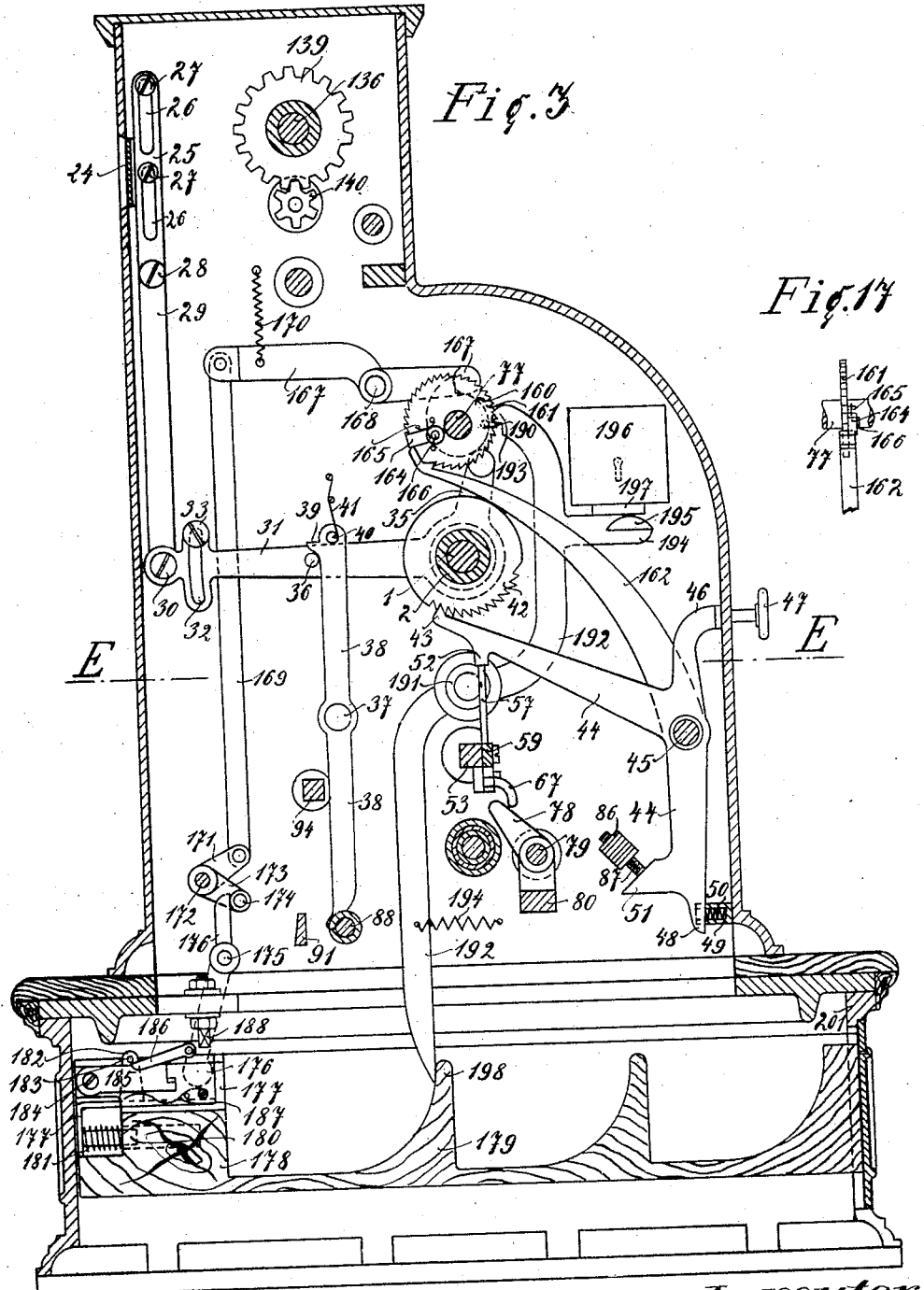
Figure 4:
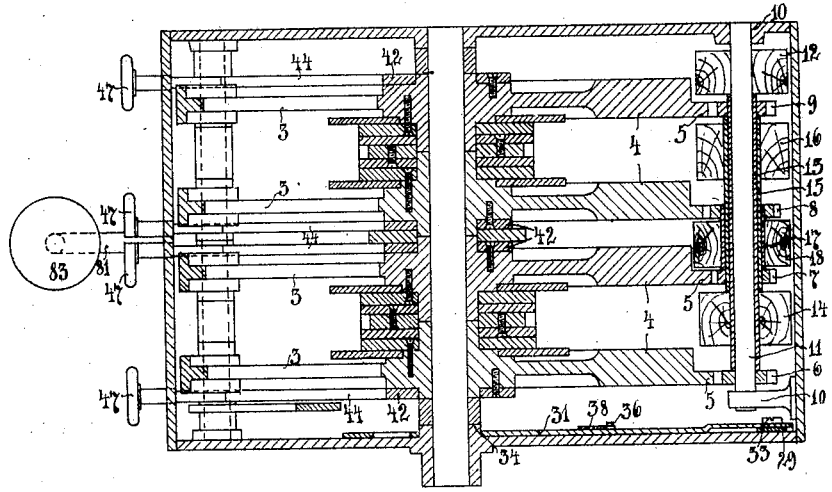
Figure 5:
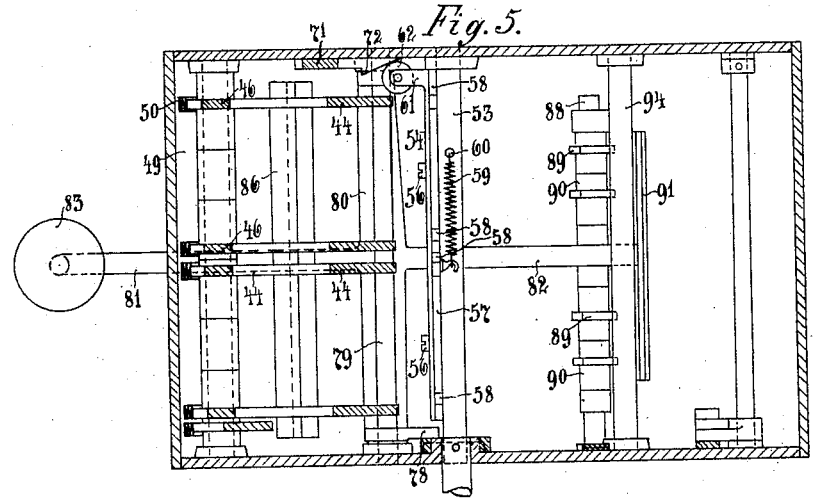

Figure 1 is a vertical longitudinal section on the line A A of Fig. 2; Fig. 2, a vertical cross-section on the line B B of Fig. 1 turned to the left; Fig. 3, a vertical cross-section on the line C C of Fig. 1 turned to the right; Fig. 4, a horizontal section on the line D D of Fig. 2; Fig. 5, a horizontal section on the line E E of Figs. 2 and 3; and Fig. 6, a front view of a portion of the cash-register. Figs. 7 to 11 illustrate one form of construction, Fig. 8 being a section on the line F F of Fig. 7, Fig. 9 being a view showing a number-segment and the device for transmitting the movement thereof to the adding mechanism in one position, and Fig. 10 a section on the line G G of Fig. 9. Figs. 12 to 16ª represent construction details thereof. Fig. 17 represents a front view of a portion of Fig. 3. Fig. 18 represents a cam-disk in section on the line H H of Fig. 1 turned to the left. Fig. 19 is a plan view of the locking device for the adding-crank in partial section; Fig. 20, a plan view thereof after the first revolution of the adding-crank, and Fig. 21 an elevation of an adding-disk in partial section.

On the shaft 1 are mounted the number-segments, each of which comprises two segmental parts 3 and 4, fixed to a hub 2, Fig. 2, the segments 3 being partly cut away in order to render them lighter than the segments 4. Each segment 4 is provided with a toothed edge 5, adapted to gear with toothed wheels 6 7 8 9, Fig. 4. The toothed wheel 6 is fixed to one end of the shaft 11, which is rotatable in bearings 10, and to the other end of which is fixed the disk 12. On the shaft 11 is mounted the sleeve 13, to which are fixed the toothed wheel 9 and the disk 14. On the sleeve 13 is mounted the sleeve 15, to which are fixed the toothed wheel 7 and the disk 16, and on the sleeve 15 is mounted the sleeve 17, to which are fixed the toothed wheel 8 and the disk 18. The disks 12, 14, 16, and 18 are provided with pins 19. Above the shaft 11 is arranged the shaft 20, Fig. 2, on which are loosely mounted rollers 21, corresponding to the disks 12, 14, 16, and 18. Over the disks 12, 14, 16, and 18 and the respective rollers 21 bands 22 with numbers thereon are adapted to travel. The said bands, which are preferably of white steel, travel past an aperture 23, through which they are visible from outside when the aperture is not closed by the slide 24. The latter is connected to a flat bar 25, Fig. 3, provided with two slots 26 and vertically guided on one lateral wall of the case by means of screws 27, screwed into the said wall. The bar 25 is connected, by means of a screw 28, to a rod 29, which is pivotally connected, by means of a screw 30, to a lever 31, provided with a radial slot 32, through which passes the screw 33, screwed into the lateral wall of the case. The lever 31, which is pivoted to a boss 34, Fig. 4, cast on the wall of the case, is provided with an arm 35 and a pin 36. To the wall of the case at 37 is pivoted a lever 38, with a finger 39 and a pin 40 at its upper end. A spring 41, attached to the wall of the case, bears against the said pin 40. The lower end of the said lever 38 is beveled and abuts against a rod 88, which will be described hereinafter. To the hub of each number-segment is fixed a spur-wheel 42, and into each wheel 42, Fig. 3, engages a tooth 43, fixed to a bell-crank lever 44. There are four number-segments, and consequently four spur-wheels 42 and four levers 44, the latter being mounted on a shaft 45. Each bellcrank lever 44 is provided with a projection 46, carrying a button 47, and with a projection 48, which engages into a slot in a bar 49, the slots in the latter serving to guide the levers 44. In the said slots springs 50 are so arranged that the projections 48 abut against them. Each bell-crank lever 44 is also provided with an inclined projection 51 and a pin 52, extending downward low bethe tooth 43. On a bar 53 of rectangular section fixed to the side walls of the case a bar 54 with slots 55 is rectilinearly guided by means of screws 56, passing through the slots 55. To the bar 54 is fixed the plate 57, Fig. 6, which is provided with four projections 58, corresponding in position to the pins 52 on the levers 44. To the plate 57 is fixed a spring 59, one end of which is fixed to the hook 60 on the bar 53.

Figure 6:
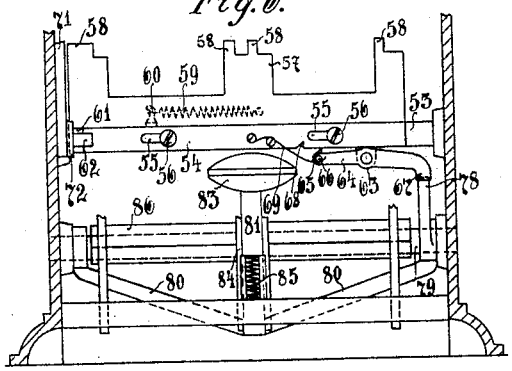

In the fork 61, fixed to the bar 53, is mounted the roller 62, Figs. 2 and 6. On one of the projections 63 of the bar 53 is pivoted a double pawl-lever 64, Fig. 6, provided with a tooth 65 and a pin 66 at one end and bent downward and rearward at its other end 67. The bar 54 is provided with a notch or aperture 68 corresponding to the tooth 65, and to the said bar is fixed a spring 69, bearing against the pin 66, so that the latter abuts against the lower edge of the bar 54 and tends to pass into the notch 68. When the pins 58 of the bar 54 are below the pins 52 of the pawls, they are locked—that is to say, cannot be depressed out of the disks 42. To the lateral wall of the case is pivoted at 70, Figs. 2 and 5, a double-armed lever, the lower end 71 of which is provided with an inclined plane 72, adapted to act on the roller 62 in the manner of a wedge. The upper end 73 of the said lever is provided with a pin 74, adapted to move in the camway 75 of the disk 76 on the shaft 77, Figs. 1, 2, 6, 18. The spring 59 imparts to the bar 54 and the parts 57 and 58 the tendency to move to the left—i. e., the left as seen in Fig. 6. This takes place if the inclined plane 72 is pulled away from the roller 62. The pins 52 of the bellcrank levers 44 are then at the sides of the pins 58; but if the part 72 presses the roller 62 to the right the pins 58 pass underneath the pins 52 and the levers 44 cannot be moved. As soon as the bar 54 has been pushed to the right by the plane 72 the tooth 65 engages into the notch 68 and holds the bar 54 fast till the end 67 of the lever 64 has been lifted. For the latter purpose the cam 78 is used, which is fixed to the shaft 79, mounted in the lateral walls of the case. To the said shaft 79 is fixed the bow 80, which carries the lever-arm 81 in front and the lever-arm 82 at the rear, the former extending out of the case and carrying the stud 83. The lever-arm 81 is guided in a fork 84, Fig. 6, within which is a spring 85, which presses the said lever upward. The said arm 81 also carries a bar 86, provided with adjustment-screws 87, abutting against the inclined projections 51 of the bell-crank levers 44. The arm 82 carries a fixed shaft 88, Figs. 2 and 5, on which are freely rotatable levers 89 with suitably upwardly-extending levers 89 with suitably broad hubs 90. The arm 82 also carries a bar 91, to which are connected four helical springs 92, connected to hooks 93 on the levers 89. As shown in Fig. 2, the latter form pawls with beveled projections. Fixed to the lateral walls of the case is a bar 94 of quadrangular cross-section. Each of the levers 89 is arranged on the shaft 88 between two number-segments, and each of the latter is provided with a pin 95, Fig. 2, extending toward the respective lever 89. By depressing the button 83 the lever-arm 81 is depressed and the lever-arm 82 lifted. The screws 87 bear on the projections 51 of the levers 44 and depress the pawls 43 out of engagement with the disks 42. In the meantime the locking projections of the levers 89 have abutted on the bar 94 and prevent the ascent of the lever 81 till the pins 95 of the descending segments 4 push aside the levers 89, so that the arm 81 can be lifted by the spring 85, and the lever 82 is consequently lowered. To each segment 4 is pivoted a rod 100, Fig. 2, connected to a crank 101, fixed to the shaft 102 or the sleeves 103 104 105 mounted thereon, to which printing-segments, outside the case and not illustrated in the drawing, are fixed. When the number-segments are adjusted, the shaft 102 or the sleeves 103 104 105 thereon are rotated, and the corresponding printing-segments are moved.

To the hub of each number-segment is fixed a clutch, to which is pivoted a rod 106, adapted to transmit the movement of the number-segment to the adding mechanism. The clutches are shown in Figs. 7–17. On the hub 2 of each number-segment is freely rotatable a driver-disk 110, provided with ratchet-teeth 111 on part of its circumference. On the number-segment hub 2 there is also mounted a disk 113, Figs. 12 and 13, fixedly connected to the number-segment by means of a screw 112. The said disk 113 is provided with a recess 114, partly in the form of a groove, and with a notch 115. In the recess 114 is pivoted at 118 a pawl 117, against which a spring 116 bears. The nose 119 of said pawl extends into the notch 115. By the side of the disk 113 a disk 120 is freely rotatable on the hub 2, the said disk 120 being provided with a locking-tooth 121, Fig. 14. With this disk 120 a toothed wheel 129, freely rotatable on the hub, is fixedly connected by means of screws 122. As shown in Fig. 1, the clutches of two adjacent number-segment hubs are so directed toward each other that one toothed wheel 129 serves for two clutches. The two toothed wheels 129 are in gear with two toothed wheels 123, fixed to the shaft 77. Pivoted at 124 to each disk 110, on the side facing away from the respective number-segment, is an anchor-shaped pawl 125, Fig. 7, against which bears a spring 126. The said pawl, which is shown in Figs. 16 and 16ª, is provided with a tooth 127, extending into the plane of the disk 113 and corresponding to the breadth of the latter. The said pawl is also provided with a tooth 128, the pawl being so bent that the said tooth is in the plane of the disk 120. The rods 106 are pivoted to the disks 110. In radial recesses in the shaft 77 are arranged rods 130, held in place by pins 131. On the said rods are wound helical springs 132, and the former serve as resilient pawls adapted to engage the teeth 111 of the disk 110.

Figs. 7 and 8 illustrate the apparatus in the starting position. By the pressure of the spring 126 the tooth 127 of the pawl 125 is pressed into the notch 115 in the disk 113. The tooth 128 is outside the periphery of the disk 120. If the number-segment 3 is turned downward about its shaft 1—that is to say, to the left— the disk 113 is moved with it, owing to the fact that the tooth 127 projects from the said disk. By this means the tooth 128 is brought into engagement with the tooth 121 of the disk 120, (see Fig. 9,) in which the number-segment is rotated through ninety degrees, and consequently the disk 113 is rotated through a similar distance. If the toothed wheel 123 is now rotated to the right, the toothed wheel 129 is rotated to the left and also the disk 120, into the tooth 121 of which the tooth 128 of the pawl engages. By this pawl the disk 110 also is rotated to the left until the tooth 127 reaches the previously-rotated notch 115, rotated in this special case through ninety degrees. As soon as the tooth 127 has moved over this notch it is pressed into it by the spring 126. Consequently the tooth 128 is moved out of gear with the disk 120 and the disks 110 cease to rotate. The rotation of the disk 110 is transmitted to the adding mechanism by means of the connecting-rod 106. The four clutches used in the present case are arranged on the respective segment-hubs at angles of ninety degrees with regard to each other, so that they come into action successively at four different periods. The adding mechanism itself is of known construction.

Fig. 21 represents one of the adding-disks 135, which is loosely mounted on a shaft 136, provided with a groove. The disk 135 is provided with a pin 137, against which bears a spring 138. On the shaft 136 is fixed a toothed wheel 139, Figs. 1 and 11, which is in gear with a toothed wheel 140, adapted to be rotated from outside by means of a key. If the shaft 136 receives rotation to the right, Fig. 21, it rotates the disks 135 by means of the resilient pins 137, and the said disks can in this manner be moved back to the zero position. The apparatus is operated by means of cranks. The crank 140ª, Fig. 1, is connected to the hub 141 of the toothed wheel 142, the said hub extending out of the case. The toothed wheel 142 is provided with a recess, in which the end of the shaft 77 is freely rotatable. On a pivot 143, fixed to the wall of the case, is mounted the toothed wheel 144, to which is fixed the toothed wheel 145 in gear with the toothed wheel 146. The crank 140ª is provided with a pin 148 and a spring 149, Figs. 19 and 20, arranged in a recess 147, and with a pin 150, the inclined end surface of which abuts against a pin 151 in a slot 152 in the pin 148. The toothed wheel 146 is provided with a hub 153, extending out of the case and carrying a pawl 154, Figs. 19 and 20. The starting position of the pawl 154 and the pin 148 with regard to each other is illustrated in Fig. 19. As soon as the crank 140ª is revolved its movement is transmitted to the toothed wheel 146 by means of toothed wheels 142 144 145 in such a manner that during two revolutions of the crank the pawl 154 makes only one revolution. At the beginning of the crank movement the pin 150 is pressed so that the pin 148 enters its recess and the crank can pass the pawl 154. During the further rotation the pin 150 is released, so that the pin 148 is caused to project again by the action of the spring 149.

After the first revolution of the crank the pawl 154 is situated in the position represented in Fig. 20, so that the pin 148 can slide over the inclined surface of 154. During the second revolution of the crank the pawl 154 returns to the position shown in Fig. 19 and the pin 148 abuts against it, so that the crank cannot be revolved farther. The toothed wheel 155 is in gear with the toothed wheel 145, the former being fixed to the shaft 77 by means of a pin 156. The wheel 155 has bearing in the side wall of the case.

Two revolutions of the crank 140ª produce one revolution of the shaft 77. On the shaft 77 are fixed the disk 160 and a ratchet-wheel 161, Figs. 1 and 3, with a chief tooth. Corresponding with this ratchet-wheel is a lever 162 with a pawl 163 and mounted on shaft 45. This lever 162 is so constructed that when the button 83 is depressed the said lever is engaged, like the levers 44, and the tooth 163 is disengaged from the ratchet-wheel 161. Pivoted at 166 to the ratchet-wheel 161 is a cone 164, against which bears a spring 165. As soon as the tooth 163 of the lever 162 is put out of gear with the ratchet-wheel 161 the cone 164 descends under the pressure of the spring 165 and prevents the engagement of the tooth 163 with the ratchet-wheel 161. The mechanism is thus unlocked, and the shaft 77 can be turned. The spring 50, bearing against the lower part of the lever 162, presses the latter against the circumference of the ratchet-wheel 161 and causes it to slide on the said wheel 161 during its rotation. As soon as this ratchet-wheel 161 has made one revolution the chief tooth of the ratchet-wheel 161 bears against the head of the lever 162 and prevents further rotation.

Against the periphery of the disk 161 bears the already-described cam 35 of the lever 31. During the turning of the said disk the cam 35 is pressed and the lever 31 raised at its forward part, so that the slide-plate 24 is also raised and makes indicate to the customer the number operated.

The double-armed lever 167, Fig. 3, abuts against the disk 161 and is movable on the pivot 168 in the side wall. To the forward part of the double-armed lever 167 is pivoted a downwardly-projecting bar 169, and a spring 170 tends to pull the said part upward. The lower end of the bar 169 is connected with a lever 171, fixed to the pivot 172, on which is firmly fixed the lever 173 with the friction-roller 174.

On a pivot 175 is movable the double-armed lever 176, the lower end of which abuts against a slide 177. This slide 177 is arranged in an opening of the rear bar 178 of the drawer 179 and is Z-shaped. To the said slide 177 is fixed a pin 180, round which a spring 181 is wound. This spring 181 imparts to the slide a tendency to move into the position shown in Fig. 3. On the slide is arranged a support 182 with a pin 183. Pivoted at 184 to the bar 178 is an arm 185, to which is fixed an inclined upwardly-projecting arm 186.

Against the arm 185 bears a spring 187, pressing the said arm upward. Fixed to the case is a downwardly-projecting pin 188, which is in vertical alinement with the arm 186, so as to abut against the pin 188 when lifted.

When the bar 169 descends, the pulley 174 on the arm 173 bears against the upper end of the lever 176. The lower end thus pulls the slide 177 out of its position, overcoming the pressure of spring 181, and the pin 183 slides over the arm 186 and presses the latter downward with the arm 185 against the pressure of spring 187, so as to allow the arm 186 to pass under the abutment 188. The drawer is now pushed out by the pressure of spring 181.

To allow of closing the drawer before each fresh operation of the cash-register, the following arrangement is made. On the wheel 161 is provided a pin 190, Fig. 3, mounted on a hub 191. On the wall of the casing is a double-armed lever 192, the upper end of which carries a pawl 193, and a rectangularly-bent arm 194 with a knob 195. Above this is a lock 196 with a bolt 197, adapted to be operated from outside the apparatus by means of a key. The lower end of the lever 192 extends to below the upper edge of the rib 198 of the drawer 179 and is engaged by a spring 194, fixed to the case. If the bolt 197 is open, the spring 194 pulls the double lever, when the drawer is opened and the tooth 193 comes within reach of pin 190 of the wheel 161. When one revolution of the latter has been made, the pin 190 abuts against the pawl 193 and prevents further rotation of the wheel and the shaft 77. To allow of rotating the shaft 77, it is necessary to pull the pawl 193 away from the pin 190. This is effected by shutting the drawer so that the rib 198 presses the lower part of the lever 192 against the pressure of spring 194. Should it be necessary to work with the drawer open, the bolt 197 is moved into the position illustrated in Fig. 3. This prevents the spring 194 from pulling the tooth 193 into reach of the pin 190, so that now no locking of the shaft 77 is effected by the drawer. Pivoted to the bar 178 is an arm 199 with a nose 200, Fig. 2. The pulling of the drawer causes this nose to abut against a bar 201, fixed to the fore part of the case, and prevents the entire pulling out of the drawer. To pull the drawer out entirely, it is necessary to press down the lever 199, so that nose 200 can pass by under the bar 201.

To the case is fixed a bell 202 with a spring-clapper 203. At the bottom of drawer 179 is a movable axle 204 with a pin 205. When the said pin extends downward, it is in reach of the spring-clapper, which it operates when the drawer is pulled out and shut. If the bell is not to be operated, the axle 180 is rotated through ninety degrees by means of a key inserted from outside.

The action of the cash-register is as follows:

*Adjustment of number-segments.*—The number-segments are rotated by means of handles projecting outward, the printing mechanism being adjusted accordingly by means of the push-rods 100, and at the same time the numbers corresponding to the amounts inserted are moved opposite the aperture 23 by the transmission-gear 19, 20, 21, and 22. The disks 113, fixed to the segment-hubs, are also rotated so that the teeth 127 of the pawl 125 move out of the spaces 115 in the disks 113, and the teeth 128 are moved into reach of the spaces 121 in the disks 120. The number-segments are held in their given positions by the pawls 43 of the levers 44. If a single segment is to be rotated backward on account of incorrect adjustment, the corresponding button 47 is pressed so that the pawl 43 is moved out of gear with the respective ratchet-wheel 42, and the segment 4 being heavier than the segment 3 the former descends and segment 3 returns to zero. If all the segments 3 are to be placed at zero at one time, the button 83 of lever 81 is pressed. The screws 87 then press against the projections 51 of the levers 44 and all the pawls 43 are put out of gear with the corresponding wheels 42. If the button 83 is depressed, the arms 89 abut against the bar 94 and prevent the upward movement of button 83 until the pins 95 of the falling segments 4 have knocked the arms 89 from the bar 94. After the adjustment of the number-segments handle 140ª is turned, the pin 148 having been moved out of reach of the nose 151 by pressing on the pin 150. By turning the handle the shaft 77 and with it the toothed wheels 123 are rotated and transmit their motion to the toothed wheels 129. The latter are connected with the disks 120, which engage the pawls 125 and rotate the disks 110, so that the adding mechanism is operated by the bars 106 until the teeth 127 fall into the spaces 115 of the disks 113 and the engagement of the disks 120 with the pawls 128 ceases, so that the adding mechanism is stopped. After the rotation of the shaft 77 the resilient pins 130 engage the teeth 111 of the disks 110 and prevent the rotation thereof, and they also prevent the premature engagement of the disks 110 and the premature operation of the adding mechanism during the adjustment of the number-segments.

In the first stage of the rotation of the handle the slide 54 57 58 is displaced in such a manner that the projections 58 are moved under the projections 52 of the levers 44, so that it is impossible to displace the number-segments after the handle has been turned, since the levers 44 cannot move out of engagement with the toothed wheels 42.

The disengagement of the slide 57 is effected by means of the cam-disk 76, which operates the lever 71 in such a manner that the wedge 72 is pushed between the wall of the case and the roller 62 of the slide 54 and consequently displaces the slide 54 with the plate 57, whereby the pawl 64 engages the recess 68 in the bar 54 and locks the latter. In the last stage of the rotation of the handle the disk 160 first operates the cam 35 and then the cam 167. The operation of the cam 35 causes the fore end of lever 31, and consequently the bar 29 and the plate 24, to be lifted, so that the amount inserted is indicated to the buyer. As soon as the lever has reached a sufficient height the pin 36 abuts against the tooth 39, and the lever 31 and screen 24 are thus kept in the elevated position. The operation of the cam 167 by the disk 160 causes the bar 169 to be pressed downward and the lever 176 to be rotated by means of the roller 174, and the opening of the drawer is thus effected. If at this moment the bolt 197 of the lock 196 is in its upper position, the lower part of the lever 192 is pulled by the spring 194, and consequently the tooth 193 at the upper end of this lever is brought into reach of the pin 190 of the ratchet-wheel 161, whereby further rotation of this wheel is prevented. Simultaneously the pin 164 abuts against the upper end of lever 162, and thus also prevents further movement of the wheel. The motion of the handle is then at an end, the lever 71 is again operated by the cam-disk 76, and the catch-pin is drawn back, so that the bar 54 can yield to the spring 59 as soon as the pawl 64 is disengaged.

To adjust the cash-register for use after it has been operated, the drawer is first shut, the tooth 193 being removed from the pin 190. By pressing the button 83 the front end of the lever 81 is depressed and the rear end 82 is raised. During the lowering of the lever-arm 81 the nose 78 first presses against the arm 67 of the pawl 64, so that the tooth 66 is moved out of the recess 68 in the bar 54, and the latter moves with the bar 57 to the left-hand side under the action of spring 59, so that the points 58 release the projection 52 of the levers 44. During the further downward movement of lever 81 the screws 87 bear on the projections 51 of the levers 44, so that the pawls 43 are moved out of gear with the disks 42. In the meantime the lever-arm 82 has ascended and the bars 89 have abutted against the bar 94, so that the lever 81 cannot ascend again until the descending segments 4 have removed the arms 89 from the bar 94 by means of the pins 95. During the upward movement of the lever-arm 82 the arm 38 is rotated about the pivot 37 by means of the axle 88, so that the lever 31, with the plate 24, can fall back again. During the depression of lever 81 the arm 162 is so rotated as to move the tooth 163 out of gear with the toothed disk 161, and the cone 164 moves between the upper end of bar 162 and the periphery of the disk 161, by which means the crank is unlocked. The number-segments can thereupon be adjusted again, or the drawer can be opened without adjusting the number-segments.

I claim—

1. In a cash-register, the combination of a plurality of number-segments, an axle on which said segments are movably mounted, ratchet-wheels connected with said segments, a series of bell-crank levers corresponding in number to the number of segments, pawls on said levers, a shaft on which said axle is mounted and guides for the lower ends of said bell-crank levers, helical springs mounted in said guides and pressing against the lower ends of said levers, inclined surfaces on said levers, and outwardly-projecting buttons from said levers.

2. In a cash-register, the combination of pawl-levers, pins projecting from said levers, a bar, a locking-plate provided with slots therein, screws passing through said slots and engaging said bar to guide said plates, and projections on said locking-plate corresponding with said pins.

3. In a cash-register, the combination of pawl-levers, a movable locking-plate for said levers, a bar on which said plate is mounted, a spring fixed to said bar and said locking-plate, a fork on said locking-plate, a roller mounted in said fork, a movable lever provided with a wedge-shaped end, a cam-disk adapted to push said wedge between the roller and the wall of the cash-register case, in order to displace said locking-plate, a pawl pivoted to said bar and a tooth in said movable locking-plate with which said pawl is adapted to engage.

4. In a cash-register, the combination of a casing, a segment, a fixed axle about which said segment is movable, a forwardly-extending lever provided with a button outside of said casing, a guide for said lever, a spring in said guide, a bar secured to said lever, adjusting-screws provided for said bar, a lever projecting to the rear, a cross-bar provided for said lever, pawls pivoted to said cross-bar, a second cross-bar, springs connected to said pawls and to said second cross-bar, a bar of quadrangular cross-section mounted in said casing, and pins on the rearward part of said segments adapted to engage with said pawls.

5. The combination of rearward segments, toothed segments connected thereto, a series of concentric hollow shafts, toothed wheels on said hollow shafts, and gearing with said toothed segments, pulleys on said shafts, pulleys vertically above the same indicator-ribbons on said pulleys, and means for allowing the ribbons to be observed.

6. In a cash-register, the combination of a casing, indicator-ribbons, means for allowing the ribbons to be observed, said means comprising a shutter and an opening for said casing, a cover-plate for said opening, a bar, screws in said bar passing through slots in said cover-plate to guide said plate, a lever, a rod connecting said bar to said lever, a cam on said lever, a cam-disk adapted to operate said cam, a pin on said lever, provided with a tooth, against which said pin abuts, and a spring for said lever.

7. In a cash-register, the combination of a plurality of number-segments with projecting hubs, ratchet-wheels and disks rotatably mounted on each of said hubs, said disks being provided with a single tooth each, toothed wheels and disks provided with recesses with which said ratchet-wheel and first-named disks are connected, a resilient tooth mounted in the recess of each of said last-named disks connected with the number-segments, a pawl on each ratchet-wheel, an adding mechanism, and rods connecting the ratchet-wheels with said adding mechanism.

8. In a cash-register, the combination of number-segments provided with hubs, ratchet-wheels and single-tooth wheels on said hubs, toothed wheels and recessed disks provided with resilient teeth with which said ratchet-wheels and single-tooth wheels are connected, a shaft, toothed wheels and resilient pins adapted to engage with the teeth of the ratchet-wheels.

9. In a cash-register, the combination of an axle, number-segments carried by said axle, a shaft, toothed wheels mounted on said shaft, a crank for said shaft, a toothed wheel connected with said crank, a second toothed wheel mounted on a pivot on the wall of the cash-register gearing with said crank-wheel, a second toothed wheel with which said last-named wheel engages, a toothed wheel gearing with the last-named wheel and fixed to the shaft and with a toothed wheel having a pin and a nose on said pin, a resilient pin in the crank-handle, and a pin for pushing back the said resilient pin.

10. In a cash-register, the combination of a shaft, toothed wheels carried by said shaft, a ratchet-wheel, a resilient locking-cone on said ratchet-wheel, pivoted pawl-levers a lever with a locking-tooth mounted on the pivot of the pawl-levers, engaging with its upper end, the ratchet-wheel and extending beyond said pivot in the same manner as the pawl-levers.

11. In a cash-register, the combination of a drawer provided with a resilient slide, a rotatable lever a support on said slide, a pin carried by said support, and a locking-pin which the rotatable lever abuts against when elevated, but clears when lowered.

12. In a cash-register, the combination of a drawer provided with a resilient slide, a double-armed lever pivoted to the casing, a second double-armed lever, a connecting-rod for said second lever, a short double-armed lever provided with a cam, a cam-disk for operating said cam and a spring for holding said last-named lever in normal position.

13. In a cash-register, the combination of a drawer, means for locking and unlocking said drawer, a double-armed lever with a pawl at its upper end, a ratchet-wheel, a pin on said ratchet-wheel, a rectangular bent arm on said double-armed lever, and a lock for said arm adapted to be operated with a key on the outside of the register.

In testimony whereof I have hereunto set my hand in presence of two witnesses.

PETER MEYER.

Witnesses:
GUSTAV CLEUER,
WILHELM KÜPPERS.